United States Patent [19]
Diedrich

[11] Patent Number: 5,829,880
[45] Date of Patent: Nov. 3, 1998

[54] TEMPERATURE SENSOR HOUSING

[75] Inventor: Udo Diedrich, Gevelsberg, Germany

[73] Assignee: Delphi Automotive Systems Deutschland GmbH, Wuppertal, Germany

[21] Appl. No.: 772,214

[22] Filed: Dec. 20, 1996

[30] Foreign Application Priority Data

Mar. 6, 1996 [DE] Germany ........................ 196 08 675.2

[51] Int. Cl.⁶ .................................................. G01K 13/02
[52] U.S. Cl. .............................. 374/208; 374/147; 285/93
[58] Field of Search ..................................... 374/147, 148, 374/208, 100, 135, 179; 285/93, 319, 921

[56] References Cited

U.S. PATENT DOCUMENTS

| 4,509,550 | 4/1985 | Monk ........................................ 374/148 |
| 4,575,262 | 3/1986 | Andersen ................................. 374/147 |
| 5,149,144 | 9/1992 | Blakeley ................................... 285/93 |
| 5,199,790 | 4/1993 | Pawelzik et al. ........................ 374/208 |
| 5,342,126 | 8/1994 | Heston et al. ........................... 374/208 |
| 5,667,305 | 9/1997 | Walker .................................... 374/208 |
| 5,667,306 | 9/1997 | Montreuil et al. ...................... 374/208 |

FOREIGN PATENT DOCUMENTS

| 1081980 | 12/1954 | France .................................... 374/148 |
| 2512202 A | 3/1983 | France . |
| 2711393 A | 4/1995 | France . |
| 3709122A1 | 9/1988 | Germany . |
| 275171A3 | 1/1990 | Germany . |
| 9102784.5 | 7/1991 | Germany . |
| 4237038A1 | 5/1994 | Germany . |
| 19608675.2-52 | 3/1996 | Germany . |
| 2207509 | 2/1989 | United Kingdom . |

OTHER PUBLICATIONS

European Search Report & Annex dated 12 Jun. 1997 corres to EP 97 20 0453.
Patent Abstracts of Japan #07270247 A, Oct. 20, 1995.

*Primary Examiner*—G. Bradley Bennett
*Attorney, Agent, or Firm*—Cary W. Brooks

[57] ABSTRACT

In a media conducting device which effects a temperature measurement of the medium is used a media conducting pipe 11 with a lateral exit on which is arranged a group of sensors. This component group includes a sensor housing with electric temperature sensor 40 with two contact pins 27, 28 projecting from the sensor housing. In order to develop an inexpensive, space-saving device it is proposed to provide the pipe 11 with a one-piece connecting piece 12. This results in a T-pipe combination 10. The moulded-on connecting piece 12 thus forms the essential part of the sensor housing, whilst the remainder of the sensor housing consists of a stopper 30. This stopper 30 is a constituent part of a plug unit 20 which serves merely as support for the contact pins 21, 22 and the temperature sensor 40 connected thereto. The connection between the plug unit 20 and the connecting piece 12 of the T-pipe combination 10 is effected by means of a simple plug coupling, where the inner section 15 of the connecting piece 12 forms the plug receptacle and the stopper 30 forms the plug-in part of the plug coupling.

3 Claims, 3 Drawing Sheets

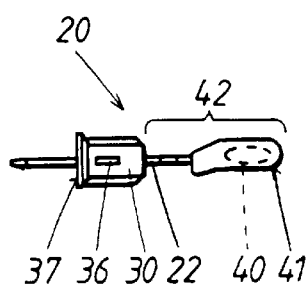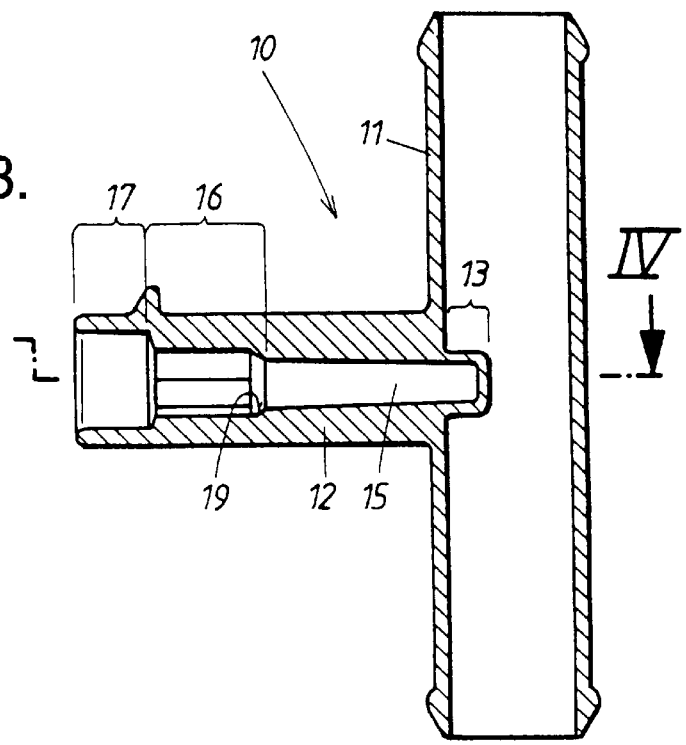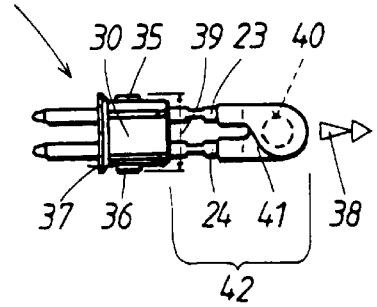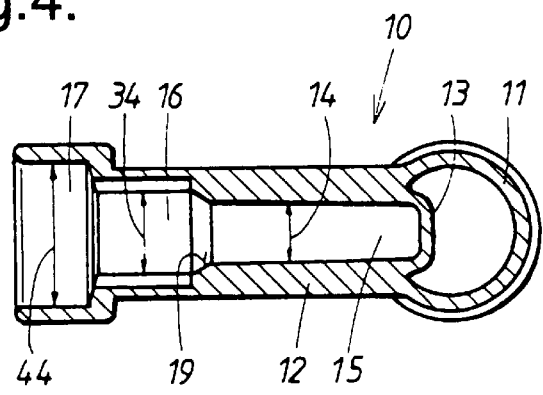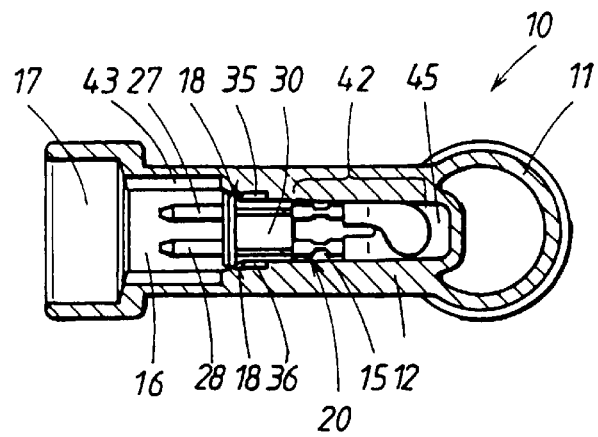

TEMPERATURE SENSOR HOUSING

TECHNICAL FIELD

An important field of application for this device is the flow guidance of media in the air conditioning system of a motor vehicle. Here it is important to measure the temperature of the flowing medium and to use the measured result for controlling the air conditioning system.

BACKGROUND OF THE INVENTION

In a known device a sensor component with a housing is used in which an electric temperature sensor is encapsulated and only two contact pins project from the sensor housing. The sensor housing has a thread on its circumference through which the entire component group can be screwed into a lateral outflow of a medium conducting pipe which is provided with an internal thread. This known device is explained in more detail in FIG. 2 as follows.

In the known device there is the danger of a leakage in the screw connection between the medium conducting pipe and the sensor component group. The elements of the sensor component group consist of expensive material and require a time-consuming, costly assembly. The known device has a relatively heavy weight and large dimensions, which cause space problems during assembly and servicing.

SUMMARY OF THE INVENTION

In the invention a substantial component part of the sensor housing is combined with the medium conducting pipe; for this a connecting piece is used which is constructed in one piece with the pipe and together with this forms a T-pipe combination. The remaining component part of the sensor housing is a stopper which itself is a component part of a very simply constructed plug unit. The stopper at the same time serves as holder for the two contact pins connected to the temperature sensor and together with the contact pins and the temperature sensor forms the plug unit which is handled as a whole. The stopper of this plug unit on the one hand and an inner section of the connecting piece on the other hand form the two complementary coupling elements of a common plug-in coupling which in order to be connected require only one axial plug-in movement of the unit into the interior of the connecting piece. The plug-in position of the two coupling component parts is secured by a wedge seat between the stopper and the inner section of the connecting piece. The T-pipe combination can be manufactured very cheaply from plastics, has a light weight and enables the device according to the invention to be assembled very compactly. An excellent media seal is especially ensured when the connecting piece is closed on its inner end facing the pipe already during the construction of the T-pipe combination. In every case a seal is provided by the force fit of the plug-in coupling consisting of the inner section of the connecting piece and the stopper of the plug unit seated therein.

BRIEF DESCRIPTION OF THE DRAWINGS

Further measures and advantages of the invention result from the sub-claims, the following description and the drawings. In an embodiment example of the drawings are disclosed both the state of the art as well as the invention. There is shown:

DESCRIPTION OF THE PREFERRED EMBODIMENT

Figure 2:
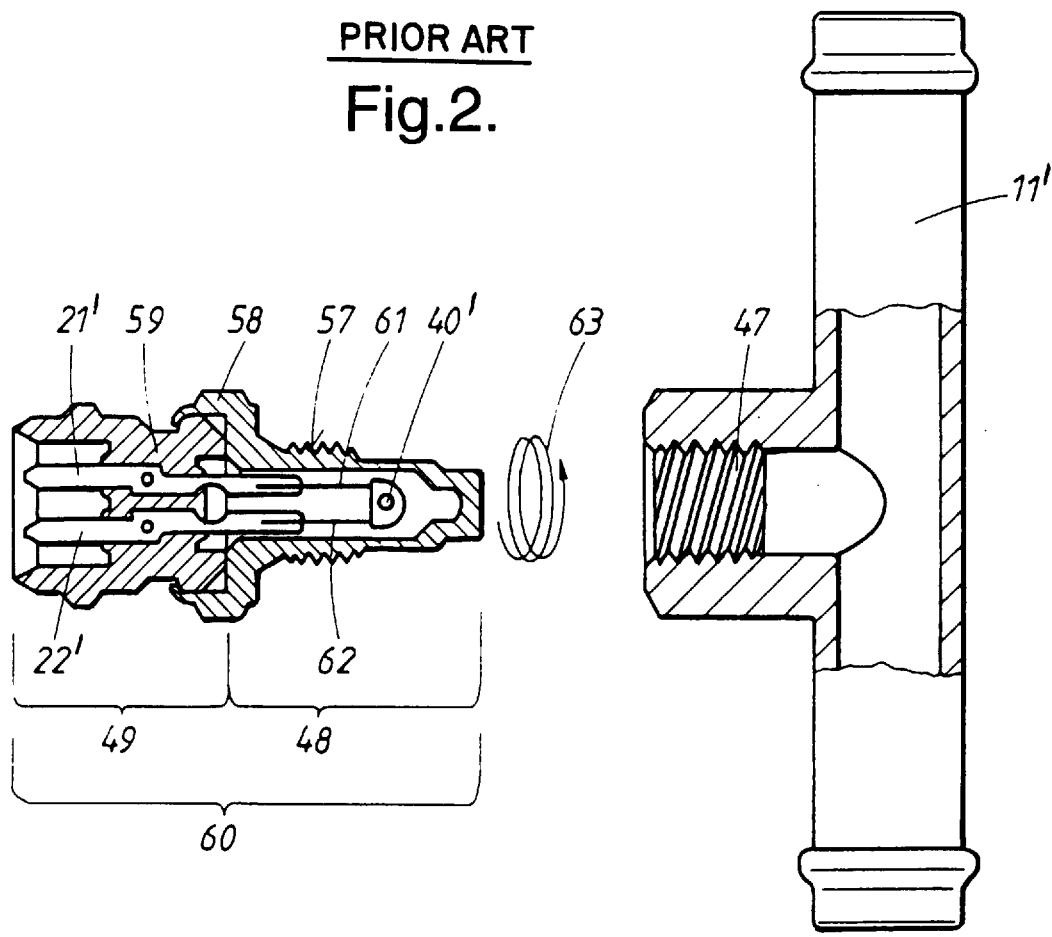

Before the state of the art according to FIG. 2 is mentioned finally, the invention is now explained. This consists of a compact T-pipe combination 10 and a very simply constructed plug unit 20.

The T-pipe combination is constructed in one part of plastics and comprises a medium-conducting pipe 11 on the one hand and a connecting piece 12 projecting away from it on the other hand, which provides the housing for the already mentioned plug unit 20. To the pipe 11 are connected a tube 31 supplying the medium at one end and a tube 32 taking away the medium at the other end, for which e.g. hose pipes are used. For this purpose the pipe 11 can have suitable connecting aids 33. Whilst the pipe 11 has a circular profile, the connecting piece 12 has an elongated oval-shaped cross-section whose longitudinal oval axis exits perpendicular to the medium conducting pipe 11, as shown by the internal width 14 in FIG. 4. The inner connecting piece end 13 projects into the pipe profile of the pipe 11 and is locked in there sealed to the medium, which is already achieved during the plastics manufacture of the T-pipe combination. The connecting piece 12 can be split into a number of sections 15 to 17 which have a different internal width 14, 34, 44 to each other.

Figure 6:
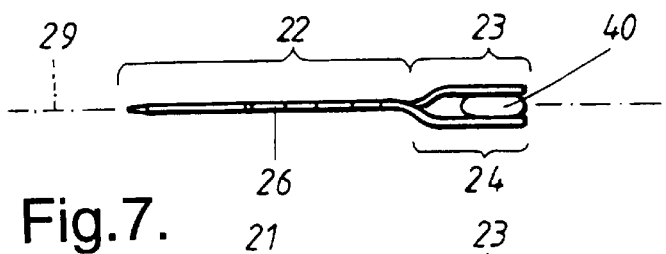
Figure 7:
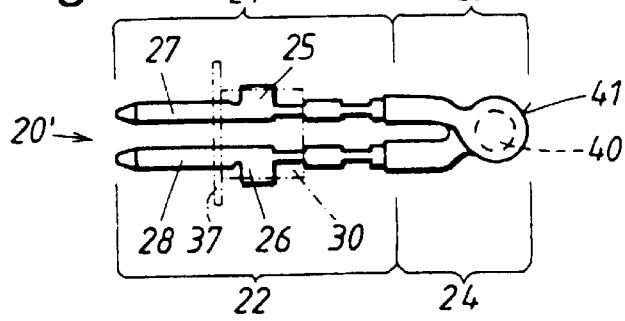

The construction of the plug unit 20 can best be explained with the aid of FIGS. 6 and 7, where previous manufacturing stages are shown. A substantial component part of this construction unit 20 is a pair of stamped out products, initially strip-shaped in one piece, are constructed in mirror-image to each other, which by the finishing technique are stamped out of a continuous metal strip in the form of a frame and bent at right angles to each other in certain areas. This stamped product pair can be arranged into areas 21 to 28 shown in FIGS. 6 and 7 whose function will be explained in more detail. In FIG. 7 the two parts of the stamped product pair are shown in a later assembled state when compared to that of FIG. 6 where, compared to adjacent stamped product, both a stamped product pair as well as the two stamped products of a pair are already separated from each other from the metal bounds which have existed until then. FIG. 6 shows a preceding finishing stage. Because of the side view in FIG. 6 it is impossible to see the still existing connection between the two pair.

The essential component part of this stamped product pair are two contact pins 21, 22 with flat metal profile which in the central region have small side plates 25, 26 which point away from each other. These contact pins 21, 22 become two single-piece contact lugs 23, 24 which are bent out not only side by side on top of each other but are also bent out of their common pin plane 29, shown in FIG. 6 in broken lines. So long as the two pin pairs are linked together in a common stamping product, the two crimped together connecting lugs 23, 24 are under a certain spring tension of the material, so that between them a button-like temperature sensor 40, especially a thermistor, can be initially wedged in, as shown in FIG. 6. The pin pair still linked together is then dipped in a solder bath where the necessary electric connection between the connecting lugs 23, 24 and the thermistor 40 comes about. The still solder-warm connecting lugs 23, 24 are then placed in an epoxide powder which is melted by the heat of the warmth left behind by the soldering of the connecting lugs 23, 24 and produces the insulation layer 41, shown in FIG. 7, around the thermistor 40 and the connecting lugs 23, 24 soldered thereto. The stamped product pair can then be separated from the remaining pairs and from each other in the metal strip and there results the initial product 20' of the plug unit 20 as shown in FIG. 7.

As shown in FIG. 7 in dash-dot lines, the initial product 20' is provided in the central region of the contact pins 21, 22 with a stopper 30 of plastics material which serves to secure these pins 21, 22. The stopper 30 has an end flange 37 from which project two pin ends 27, 28. Although the cross-section of the stopper 30 is matched to the opening width from the inner section 15 of the afore-described connecting piece 12, the two small plates 25, 26 of the contact pins 21, 22 do still project on both sides over the circumferential surface of the stopper 30, as shown in the dot-dash line in FIG. 7, and produce two diametrically opposite projections 35, 36. The plug unit 20 is thus completely finished, the operational section 42 with the thermistor 40 surrounded by an insulating layer on its one end and the two pin ends 27, 28 projecting from the stopper 30 at the other end.

The assembly of the plug unit 20 in the T-pipe combination 10 takes place by simply sliding the unit 20 into the connecting piece 12 in the direction of arrow 38 as shown in FIG. 4. The clear widths 44, 34 in the end section 17 or the central section 16 are sufficiently wide when compared to the total dimension 39 of the stopper 30 in the region of the two diametrical projections 35, 36, which however no longer applies to the clear width 14 of the inner section 15. Although during assembly 38 the operational area 42 of the unit 20 which projects inwardly from the stopper 30 travels undisturbed into pipe interior, as shown in FIG. 5, the projections 35, 36 do dig into the inner all surface 18 of the inner pipe section 14 and ensure for a wedge seat of the entire plug unit 20 in the T-pipe combination 10. The plug-in depth of the unit 20 is limited by the end flange 37 on the stopper side abutting against a conical inner shoulder for introducing in the present case a unit 20, which is brought about by the different widths 14, 34 of the two pipe sections 15, 16.

Figure 1:
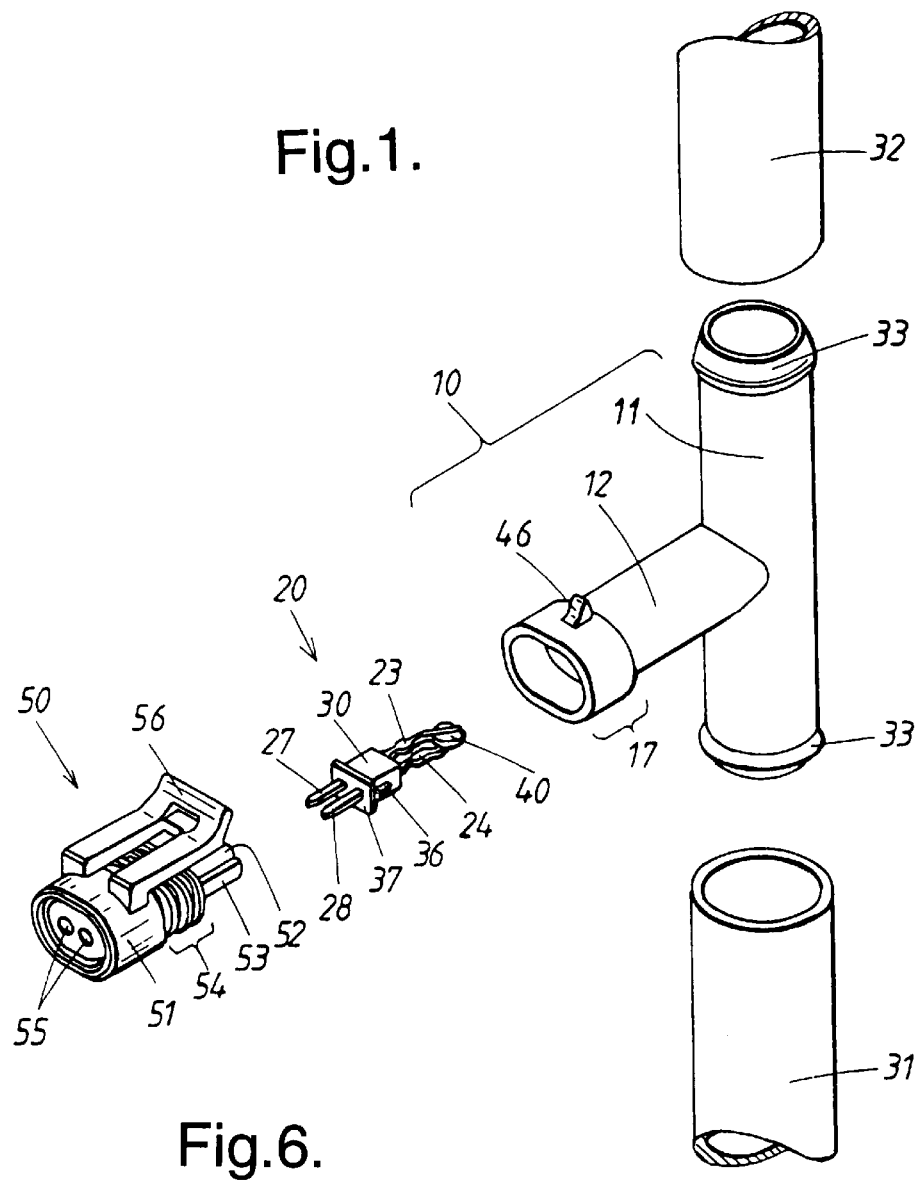
FIG. 1 in perspective, in exploded representation the component parts of the device of the invention together with two connectable tubes or the like for the in or outflow of a flow medium, FIG. 2 in side view and in axial section two component parts of the known device, partly preassembled, according to the state of the art, FIG. 3 in a representation analogous to FIG. 2, partly in axial section, the side view of two component parts of the device according to the invention already shown in FIG. 1, namely a T-pipe combination on the one hand and a plug unit which can be connected thereto by a plug-in coupling on the other hand, FIG. 4 the two component parts in FIG. 3, along the cutting line IV—IV shown there, partly in cross-section and partly in plan view, FIG. 5 in a representation corresponding to FIG. 4, the two component parts shown there coupled together, and FIGS. 6 and 7 in enlargement, the side view or plan view of the component parts of the plug unit in two different stages of their manufacture.

During this plug-in assembly 38 the two connecting pieces 12 of the T-pipe combination 10 and the stopper 30 act like two coupling parts of a plug-in coupling; the inner section 15 of the connecting piece 12 serves as "plug-receptacle", whilst the stopper 30 fulfils the function of a "plug-in part" of this coupling. The two projections 35, 26 ensure the coupling position of these two coupling parts 15, 30. In the event of a coupling, according to FIG. 5, the two pin ends 27, 28 project into the centre section 16 of the connecting piece 12 where they can be contacted by an electrical bush part 50, shown in FIG. 1. The bush housing 51 comprises an offset housing part 52 on which is located an annular elastic seal 54. In the bush housing 52 are located the electric contact bushes whose electric connecting lines are led out through the openings in the housing which are designated 55 in FIG. 1. For the better control and, if required, plug coding, the housing part 52 has guide ribs 53 which can exit in grooves 43 in the pipe centre section 16. The elastic annular seals 54 in the bush housing 51 in this case come to rest in the end section 17 of the connecting piece 12 which has acorrespondingly dimensioned clear width 44. The mechanical tie between the bush part 50 and the T-pipe combination 10 is effected by a flexible bracket 56 seated on the bush part 50, as can best be seen in FIG. 1, which bracket 56 when fully connected electrically engages a catch 46 which is located on the circumference of the pipe end section 17.

The inner section 15 of the connecting piece on the one hand and the stopper 30 on the other hand form a "housing" which encapsulates on all sides the operational area 42 of the plug unit 20, as shown in FIG. 5. For improved heat conduction, prior to the plug-in assembly 38 of the unit 20, a paste 45 can be introduced into the interior of the pipe inner section 15 which improves the temperature conduction to the thermistor 40. It goes without saying that the number of radial projections 35, 36 can be altered, just as these can also be made from the material of the stopper 30 rather than from the metal material of the pins 21, 22.

The known device according to FIG. 2 consists of a media conducting pipe 11' which has a lateral thread exit 47'. Part of this pipe 11' is a complex sensor group which itself is prefabricated and which forms a two-part sensor housing of a threaded metal sleeve 48 on the forward sensor housing and a plastics bush 49 on the rear sensor housing. The connection between these two parts of the sensor housing was formed by a complicated flanging over of a sleeve part 58 on the threaded sleeve 48 about a head piece 59 on the plastics bush 49. In this case too there are provided two contact pins 21', 22' which are however arranged at both ends in the interior of the plastics bush 49 and, via additional solder points, provided with separate connecting pipes 61, 62 which lead to a temperature sensor 40' located in the interior of the threaded sleeve 48, where they are contacted.

The connection of the sensor unit 60 with the media conducting pipe 11' in the known device is effected by a thread engagement which is expensive and complicated to implement. This is because the threaded sleeve 48 has a circumferential thread 57 which during screw turning in the direction of the arrow 63 engages the inner thread of the lateral exit 47' of the pipe 11'. This results in sealing problems for which additional sealing means are required.

I claim:

1. A temperature sensing system comprising:

a medium conducting pipe, a tube, an integral temperature sensing plug-in unit, and a bush housing, the tube being attached to the pipe at an angle and constructed and arranged to receive the integral temperature sensing plug-in unit, the bush housing having a main body part and a male projection extending outwardly from the main body part and having elastic annular seal over the male projection, and electrical contact lines extend through the bush housing, the integral temperature sensing plug-in unit being constructed and arranged for insertion into the tube as a single piece and having a pair of electrical contact pins attached to a themistor body and a stopper molded over a portion of the electrical contact pins so that a free end of the electrical contact pins extends outwardly from the stopper, the stopper further comprising projections extending outwardly and constructed and arranged to dig into an inner surface of the tube when the integral temperature sensing plug-in unit is inserted into the tube, and wherein the integral temperature sensing plug-in unit is constructed and arranged as a single piece to be inserted in the tube, the tube comprising a surface defining a conical shaped recess for receiving the thermistor body of the integral temperature sensing plug-in unit, the inner surface of the tube having a shoulder adjacent the surface defining the conical shaped recess, the shoulder being positioned to limit the forward movement of the integral temperature sensing plug-in unit, a stopper receiving portion adjacent the shoulder constructed and arranged so that the projections on the stopper dig into the surface defining the stopper receiving portion when the integral temperature sensing plug-in unit is inserted into the tube, the tube further comprising a shroud at one end for surrounding the free ends of the pins and constructed and arranged to receive at least a portion of the male projection and annular seal of the bush housing.

2. A temperature sensing system as set forth in claim 1 wherein the tube further comprises a lock nub on the outer surface thereof, and the bush housing further comprises a lock arm on the outer surface thereof for lockably engaging the lock nub and securing the bush housing and integral temperature sensing unit in mateable engagement with the tube.

3. A temperature sensing system as set forth in claim 1 wherein the tube comprises an inner connecting piece end that projects into the profile of the medium conducting pipe.

\* \* \* \* \*